(12) United States Patent
Fu

(10) Patent No.: US 11,303,119 B2
(45) Date of Patent: Apr. 12, 2022

(54) POWER SUPPLY DEVICE AND DISPLAY DEVICE

(71) Applicants: HKC CORPORATION LIMITED, Guangdong (CN); CHONGQING HKC OPTOELECTRONICS TECHNOLOGY CO., LTD., Chongqing (CN)

(72) Inventor: Wei Fu, Chongqing (CN)

(73) Assignees: HKC CORPORATION LIMITED, Shenzhen (CN); CHONGQING HKC OPTOELECTRONICS TECHNOLOGY CO., LTD., Chongqing (CN)

( * ) Notice: Subject to any disclaimer, the term of this patent is extended or adjusted under 35 U.S.C. 154(b) by 0 days.

(21) Appl. No.: 17/042,350

(22) PCT Filed: Nov. 26, 2018

(86) PCT No.: PCT/CN2018/117396
§ 371 (c)(1),
(2) Date: Sep. 28, 2020

(87) PCT Pub. No.: WO2020/019604
PCT Pub. Date: Jan. 30, 2020

(65) Prior Publication Data
US 2021/0028620 A1    Jan. 28, 2021

(30) Foreign Application Priority Data
Jul. 25, 2018 (CN) .......................... 201810827309.6

(51) Int. Cl.
*G06F 3/038* (2013.01)
*G09G 5/00* (2006.01)
(Continued)

(52) U.S. Cl.
CPC ....... *H02H 11/007* (2013.01); *G02F 1/13452* (2013.01); *G09G 3/3696* (2013.01); *G09G 2330/02* (2013.01)

(58) Field of Classification Search
CPC ............ G02F 1/13452; G09G 2330/00; G09G 2330/02; G09G 2330/026; G09G 2330/04; G09G 3/20; G09G 3/3696; H02H 11/007
See application file for complete search history.

(56) References Cited

U.S. PATENT DOCUMENTS 5,715,128 A    2/1998  Uchikawa
7,525,291 B1   4/2009  Ferguson
(Continued)

FOREIGN PATENT DOCUMENTS

CN    1388619 A    1/2003
CN    101154353 A   4/2008
(Continued)

OTHER PUBLICATIONS

International Search Report for Application No. PCT/CN2018/117396 dated Apr. 28, 2019, 4 pages.
(Continued)

*Primary Examiner* — Insa Sadio
(74) *Attorney, Agent, or Firm* — Hauptman Ham, LLP

(57) ABSTRACT

A power supply device (100) and a display device (200). The power supply device (100) comprises a drive unit (10), a power source unit (20) and a protection unit (30); the drive unit is configured to drive the display device (200); the power source unit (20) is electrically connected to the drive unit (10); the power source unit (20) is configured to provide electric energy; the protection unit (30) is electrically con-
(Continued)

nected between the drive unit (10) and the power source unit (20); and the protection unit (30) is configured to prevent current recharge.

18 Claims, 2 Drawing Sheets

(51) Int. Cl.
    *H02H 11/00*     (2006.01)
    *G02F 1/1345*     (2006.01)
    *G09G 3/36*     (2006.01)

(56) References Cited

U.S. PATENT DOCUMENTS

| | | | |
|---|---|---|---|
| 10,014,779 B2 | 7/2018 | Cheng et al. | |
| 2017/0069264 A1* | 3/2017 | Dai | G09G 3/3233 |

FOREIGN PATENT DOCUMENTS

| | | |
|---|---|---|
| CN | 101334969 A | 12/2008 |
| CN | 203150079 U | 8/2013 |
| CN | 103972931 A | 8/2014 |
| CN | 204316176 U | 5/2015 |
| CN | 106448586 A | 2/2017 |
| CN | 107578744 A | 1/2018 |
| CN | 207074883 U | 3/2018 |
| CN | 108877719 A | 11/2018 |

OTHER PUBLICATIONS

Chinese Office Action for Application No. 201810827309.6 dated Jun. 3, 2019, 7 pages.
Chinese Office Action for Application No. 201810827309.6 dated Nov. 11, 2019, 6 pages.
Chinese Office Action for Application No. 201810827309.6 dated Apr. 24, 5 pages.

* cited by examiner

POWER SUPPLY DEVICE AND DISPLAY DEVICE

CROSS REFERENCE TO RELATED APPLICATIONS

This application is a U.S. National Stage application of, and claims priority to, PCT/CN2018/117396, filed Nov. 26, 2018, which further claims priority to Chinese Patent Application No. 201810827309.6, filed Jul. 25, 2018, the entire contents of which are incorporated herein in their entirety.

TECHNICAL FIELD

The present disclosure relates to a power supply device and a display device, and more particularly relates to a power supply device having a protection module that prevents current of a drive unit from recharging to a power supply unit during startup and a display device having a protection module that prevents current of a drive unit from recharging to the power supply unit during startup.

BACKGROUND

Liquid crystal display (LCD) panels are currently using a stable voltage drive unit of a half-pressed mode to reduce power consumption of the drive unit. The power supply unit generates a first voltage and a second voltage to the drive unit. At a moment of power-on, the first voltage of the power supply unit is firstly given to the drive unit, and then the second voltage of the power supply unit is given to the drive unit. However, since the drive unit is not in a normal working state yet, at this time, the first voltage of the power supply unit is applied to the drive unit, which may cause current to flow back to the power supply unit through a wire of the second voltage. In this case, the current recharged to the power supply unit will probably cause a problem of abnormal operation of the power supply unit.

SUMMARY

A power supply device and a display device are provided in the present disclosure to solve the problem that the current supplied to a drive unit by a power supply unit may have a current recharged to the power supply unit, which causes abnormal operation of the power supply unit at a moment of power-on.

In view of the above problem, a power supply device is provided in the present disclosure. The power supply device includes a drive unit, a power supply unit, and a protection unit. The drive unit is used to drive a display device. The power supply unit is electrically connected to the drive unit and is used to provide power. The protection unit is electrically connected between the drive unit and the power supply unit and is used to prevent current from recharging.

According to the purpose of the present application, a display device is further provided, which includes a display module and a power supply device. The power supply device includes a drive unit, a power supply unit, an electronic switch unit, and a voltage dividing unit. The drive unit is electrically connected to the display module. The power supply unit is electrically connected to the drive unit. The electronic switch unit has an input terminal, a control terminal, and an output terminal. The input terminal is electrically connected to the power supply unit, and the output terminal is electrically connected to the drive unit. The voltage dividing unit is electrically connected to the control terminal. An end of the voltage dividing unit is electrically connected between the power supply unit and the drive unit, and the other end of the voltage dividing unit is electrically connected to a ground terminal.

According to the purpose of the present disclosure, a power supply device is further provided, which includes a drive unit, a power supply unit, a protection unit, an electronic switch unit, a first resistor, and a second resistor. The drive unit is used to drive the display module. The power supply unit is electrically connected to the drive unit on a first wire and a second wire. An operating voltage of the second wire is a half of that of the first wire. The protection unit is electrically connected between the drive unit and the power supply unit. The protection unit includes an electronic switch unit having an input terminal, a control terminal, and an output terminal, where the input terminal is electrically connected to the power supply unit on the second wire, and the output terminal is electrically connected to the drive unit on the second wire; a first resistor, An end of which is electrically connected to a first node on the first wire; and a second resistor, An end of which is electrically connected to the other end of the first resistor, where a second node is disposed between the first resistor and the second resistor to electrically connect to the control terminal, and the other end of the second resistor is electrically connected to a ground terminal.

As described above, in the power supply device and the display device of the present disclosure, the protection unit that prevents the current from recharging is provided on the circuit between the drive unit and the power supply unit, so that the current recharged from the drive unit cannot reach the power supply unit, thereby avoiding abnormality of the power supply unit caused by the recharged current. The power supply unit is abnormal due to the reverse current.

BRIEF DESCRIPTION OF THE DRAWINGS

To illustrate the technical solutions according to the embodiments of the present invention or in the prior art more clearly, the accompanying drawings for describing the embodiments or the prior art are introduced briefly in the following. Apparently, the accompanying drawings in the following description are only some embodiments of the present invention, and persons of ordinary skill in the art can derive other drawings from the accompanying drawings without creative efforts.

Figure 1:
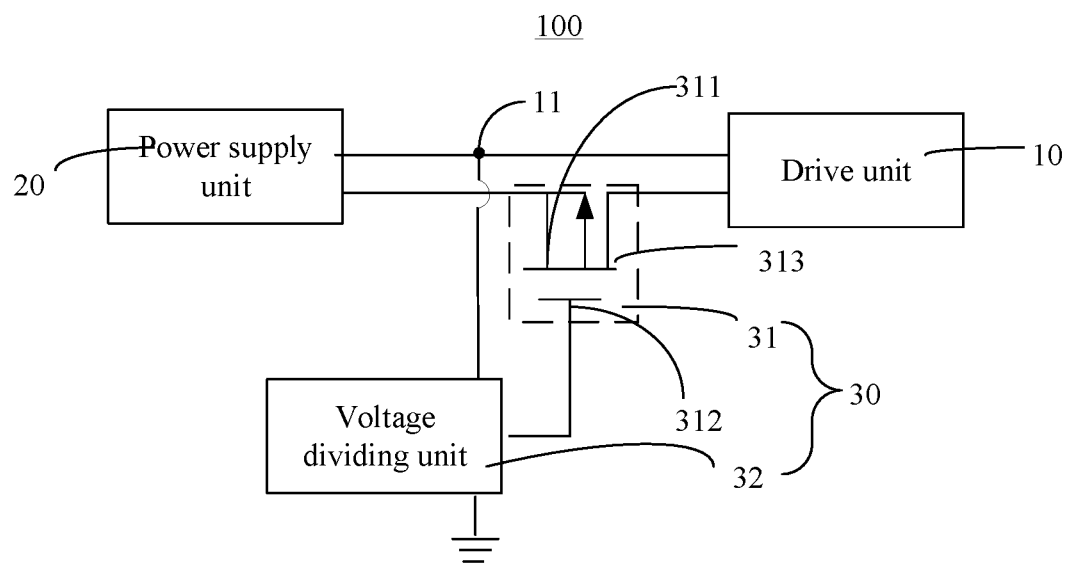
FIG. 1 is a schematic view of a circuit of a power supply device in accordance with an embodiment of the present disclosure.

Main component reference numerals:

| | |
|---|---|
| Power supply device | 100 |
| Drive unit | 10 |
| First node | 11 |
| Second node | 12 |
| Third node | 13 |
| Fourth node | 14 |
| Power supply unit | 20 |

-continued

| | |
|---|---|
| Protection unit | 30 |
| Electronic switch unit | 31 |
| Input terminal | 311 |
| Control terminal | 312 |
| Output terminal | 313 |
| Voltage dividing unit | 32 |
| First suppressing member | 321 |
| Second suppressing member | 322 |
| Third suppressing member | 323 |
| Display device | 200 |
| Display module | 210 |

DETAILED DESCRIPTION OF THE EMBODIMENTS

The technical solutions of the present disclosure will be clearly and completely described in the following with reference to the accompanying drawings. It is obvious that the embodiments to be described are only a part rather than all of the embodiments of the present disclosure. All other embodiments obtained by persons skilled in the art based on the embodiments of the present disclosure without creative efforts shall fall within the protection scope of the present disclosure.

In the description of the present application, it should be noted that the orientation or positional relationship indicated by the terms such as "center", "above", "below", "left", "right", "vertical", "horizontal", "inner", "outer", etc. is based on the orientation or positional relationship shown in the drawings, and is merely for the convenience of describing the present disclosure and for simplifying the description, and does not indicate or imply that the device or component referred to has a specific orientation, or is constructed and operated in a specific orientation, which are therefore not to be construed as limiting the disclosure. In addition, the terms "first", "second", and "third" are used merely for descriptive purposes and are not to be construed as indicating or implying relative importance.

The embodiments of the power supply device and the display device according to the present disclosure will be described below with reference to the accompanying drawings. For ease of understanding, the same components in the following embodiments are denoted by the same reference numerals.

Referring to FIG. 1, it is a schematic view of a circuit of a power supply device according to an embodiment of the present disclosure. As shown, the power supply device 100 is provided to power supply a drive unit 10, so that the drive unit 10 can suitably drive a liquid crystal display (LCD) panel. The power supply device 100 includes a drive unit 10, a power supply unit 20, an electronic switch unit 31, and a voltage dividing unit 32. The power supply unit 20 is electrically connected to the drive unit 10, and a first node 11 is disposed between the power supply unit 20 and the drive unit 10. The electronic switch unit 31 has an input terminal 311, a control terminal 312, and an output terminal 313. The input terminal 311 is electrically connected to the power supply unit 20, and the output terminal 313 is electrically connected to the drive unit 10. The voltage dividing unit 32 is electrically connected to the control terminal 312. An end of the voltage dividing unit 32 is electrically connected to the first node 11, and the other end thereof is electrically connected to a ground terminal B.

Specifically, the power supply device 100 of the present disclosure includes a drive unit 10, a power supply unit 20, an electronic switch unit 31, and a voltage dividing unit 32. The drive unit 10 can be a drain driving integrated circuit (Source Driver IC). The power supply unit 20 can be a power supply integrated circuit (power supply IC). There are two wires between the drive unit 10 and the power supply unit 20, and the power supply unit 20 transmits a startup voltage VAA and a stable voltage HVAA through two wires respectively to the drive unit 10. One of the wires has the first node 11, and the electronic switch unit 31 and the voltage dividing unit 32 are provided on the other wire. The input terminal 311 of the electronic switch unit 31 is electrically connected to the power supply unit 20, the control terminal 312 of the electronic switch unit 31 is electrically connected to the voltage dividing unit 32, and the output terminal 313 of the electronic switch unit 31 is electrically connected to the drive unit 10. The two ends of the voltage dividing unit 32 are electrically connected to the first node 11 and the ground terminal B, respectively.

Therefore, when the power supply device 100 is powered on, the power supply unit 20 supplies the startup voltage VAA to the drive unit 10 through one of the wires, and since the drive unit 10 is not working properly yet, there is current recharging to the power supply unit 20 through the other wire, and thus an abnormal operation of the power supply unit 20 occurs. At this time, the startup voltage VAA is voltage-divided by the first node 11 and the voltage dividing unit 32 to the electronic switch unit 31, and a voltage value of the divided voltage is greater than a default voltage value of the electronic switch unit 31, therefore the electronic switch unit 31 is in an OFF state, which prevent the current from recharging to the power supply unit 20, thereby avoiding the power supply unit 20 from being abnormally shut down by the recharged current.

Thereafter, when the power supply unit 20 properly outputs the stable voltage HVAA, the startup voltage VAA has stabilized at this time, so that the voltage value voltage-divided to the electronic switch unit 31 is smaller than the default voltage value of the electronic switch unit 31 to turn the electronic switch unit 31 into an ON state, thereby the stable voltage HVAA is properly supplied to the drive unit 10, and the drive unit 10 can operate properly.

Therefore, the power supply device 100 of the present disclosure with the electronic switch unit 31 and the voltage dividing unit 32 will not affect normal operation of the entire power supply device 100, and can prevent the power supply unit 20 from being abnormally shut down due to the recharged current at the instant of power-on.

Figure 2:
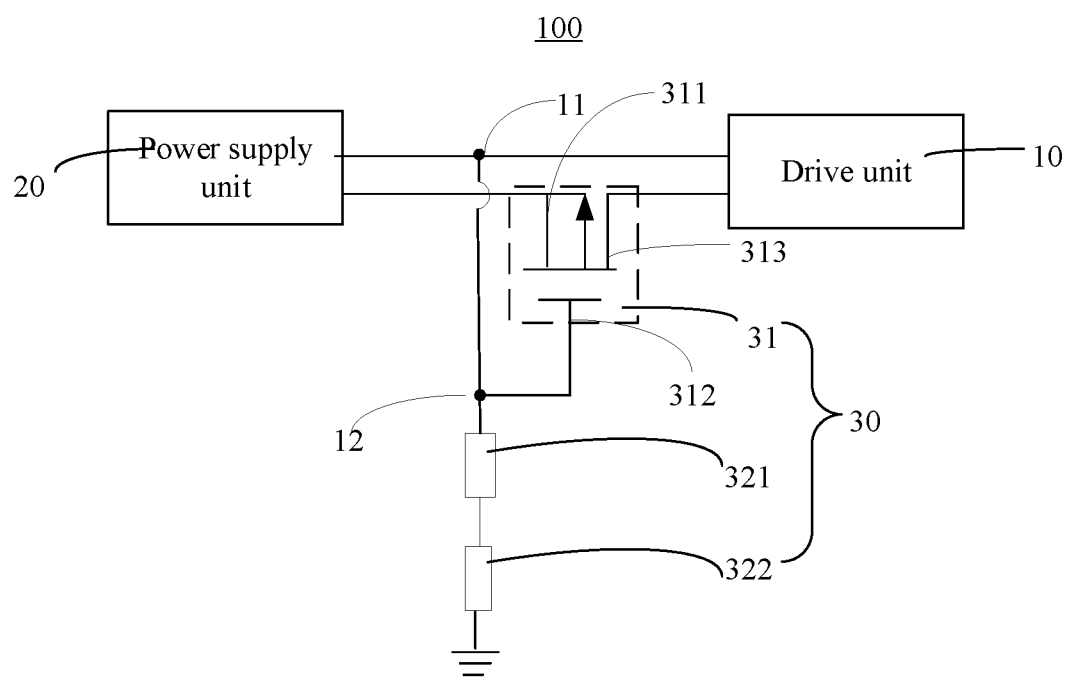
FIG. 2 is a schematic view of a circuit of a power supply device in accordance with another embodiment of the present disclosure.

Referring to FIG. 2, it is a schematic view of a circuit of a power supply device according to another embodiment of the present disclosure. Further referring to FIG. 1, actuations of the same components in the power supply device 100 of the present embodiment and the power supply device 100 of the afore-described embodiment are similar, the similarities therebetween will not go into detail herein.

As shown, the power supply device 100 includes a drive unit 10, a power supply unit 20, an electronic switch unit 31, and a voltage dividing unit 32. The drive unit 10 and the power supply unit 102 are electrically connected on a first wire and a second wire. The power supply unit 102 supplies a startup voltage VAA to the drive unit 10 through the first wire, and supplies a stable voltage HVAA to the drive unit 10 through the second wire. The voltage value of the stable voltage HVAA is a half of that of the startup voltage VAA.

The voltage dividing unit 32 includes a first suppressing member 321 and a second suppressing member 322. The first suppressing member 321 is electrically connected to a first node 11. The second suppressing member 322 is electrically connected to the first suppressing member 321 and the ground terminal, respectively. A second node 12 is disposed between the second suppressing member 322 and the first suppressing member 321, and the control terminal 312 is electrically connected the second node 12.

For example, the voltage dividing unit 32 of the present disclosure can further include a first suppressing member 321 and a second suppressing member 322. The first suppressing member 321 and the second suppressing member 322 can alternatively be resistors. The first suppressing member 321 is electrically connected to the first node 11 and the second suppressing member 322, and the second suppressing member 322 is electrically connected to the ground terminal. The second node 12 is disposed between the second suppressing member 322 and the first suppressing member 321. The second node 12 and the control terminal 312 are electrically connected to each other. Therefore, the divided voltage, generated by the startup voltage VAA passing through the first node 11, passes through the first suppressing member 321 and the second node 12 to the control terminal 312 of the electronic switch unit 31. When the voltage value of the divided voltage is smaller than the default voltage value of the electronic switch unit 31, the electronic switch unit 31 is turned into the ON state.

Further, the electronic switch unit 31 of the present disclosure can further include a transistor. An input terminal, a control terminal, and an output terminal of the transistor are respectively the input terminal 311, the control terminal 312, and the output terminal 313 of the electronic switch unit 31. That is, a source electrode, a gate electrode, and a drain electrode of the transistor correspond to the input terminal 311, the control terminal 312, and the output terminal 313 of the electronic switch unit 31, respectively.

It should be noted that, in the previous embodiment and a still another embodiment, the electronic switch unit 31 of the present disclosure can optionally be a p-channel MOSFET (PMOS) transistor.

Figure 4:
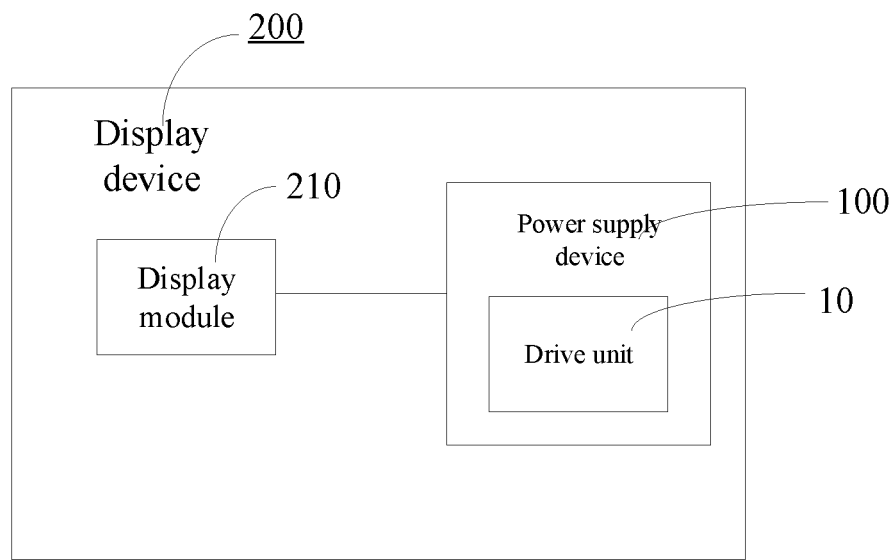
FIG. 4 is a block diagram of a display device in accordance with an embodiment of the present disclosure.

Referring to FIG. 4, it is a schematic view of a circuit according to a still another embodiment of the present disclosure. Actuations of the same components of the power supply device 100 and that of the afore-described two embodiments are similar, the similarities therebetween will not go into detail herein.

As shown, the power supply device 100 includes a drive unit 10, a power supply unit 20, an electronic switch unit 31, and a voltage dividing unit 32. The power supply unit 20 is electrically connected to the drive unit 10 by two wires. The electronic switch unit 31 has an input terminal 311, a control terminal 312, and an output terminal 313. The input terminal 311 is electrically connected to the power supply unit 20, and the output terminal 313 is electrically connected to the drive unit 10. The voltage dividing unit 32 is electrically connected to the control terminal 312. An end of the voltage dividing unit 32 is electrically connected between the drive unit 10 and the power supply unit 20, and the other end of the voltage dividing unit 32 is electrically connected to the ground terminal B.

Specifically, a first wire and a second wire are disposed between the drive unit 10 and a power supply unit 20, the power supply unit 20 can provide a startup voltage VAA and a stable voltage VAA to the drive unit 10 respectively via the first wire and the second wire. For example, the power supply unit 20 supplies the startup voltage VAA to the drive unit 10 via the first wire, and supplies the stable voltage HVAA to the drive unit 10 via the second wire.

The electronic switch unit 31 and the voltage dividing unit 32 are disposed at the second wire. The input terminal 311 of the electronic switch unit 31 is electrically connected to the power supply unit 20, the control terminal 312 of the electronic switch unit 31 is electrically connected to the voltage dividing unit 32, and the output terminal 313 of the electronic switch unit 31 is electrically connected to the drive unit 10. The two ends of the voltage dividing unit 32 are electrically connected to the third node 13 and the ground terminal B located between the drive unit 10 and the power source unit 20, respectively.

In the present embodiment, the voltage dividing unit 32 includes a third suppressing member 323. An end of the third suppressing member 323 is connected to a third node 13 located between the drive unit 10 and the power supply unit 20, and the other end of the third suppressing member 323 is electrically connected to the ground terminal B. The third suppressing member 323 can be a resistor. Moreover, a fourth node 14 is disposed between the third node 13 and the third suppressing member 323, and the control terminal 312 of the electronic switch unit 31 is electrically connected to the fourth node 14.

Therefore, when the power supply device 100 is powered on, the power supply unit 20 supplies the startup voltage VAA to the drive unit 10 via the first wire, and since the drive unit 10 has not been working properly yet, there may be current recharging to the power supply unit 20 via the second wire, thus an abnormal operation of the power supply unit 20 may occur. At this time, due to that the stable voltage HVAA has not been divided by the third node 13 and the voltage dividing unit 32 and transmitted to the electronic switch unit 31, the voltage value of the divided voltage is smaller than the default voltage value of the electronic switch unit 31, therefore the electronic switch unit 31 is in an OFF state at this time. Since the electronic switch unit 31 is in the OFF state, even if there is current recharging to the power supply unit 20 via the second wire due to that the drive unit 10 has not been working properly, the electronic switch unit 31 in the OFF state can prevent the current from recharging to the power supply unit 20, thereby prevent the current recharged from causing abnormal shutdown of the power supply unit 20.

Thereafter, when the power supply unit 20 outputs the stable voltage HVAA via the second wire properly, at this time, the divided voltage of the stable voltage HVAA through the third node 13 further passes through the fourth node 14 to reach the control terminal 312 of the electronic switch unit 31. In this case, the voltage value of the stable voltage HVAA voltage-divided to the electronic switch unit 31 is larger than the default voltage value of the electronic switch unit 31, so that the electronic switch 31 is turned into the ON state from the off-state. Therefore, the power supply unit 20 can properly supply the stable voltage HVAA to the drive unit 10 via the second wire, so that the drive unit 10 can operate properly.

It is worth to noted that, in this embodiment, the electronic switch unit 31 can optionally be an NMOS (n-channel MOSFET) transistor, and the input terminal, the control terminal, and the output terminal of the transistor are respectively the input terminal 311, the control terminal 312, and the output terminal 313 of the electronic switch unit 31. That is, the source electrode, the gate electrode, and the drain electrode of the transistor correspond to the input terminal 311, the control terminal 312, and the output terminal 313 of the electronic switch unit 31, respectively.

Figure 3:
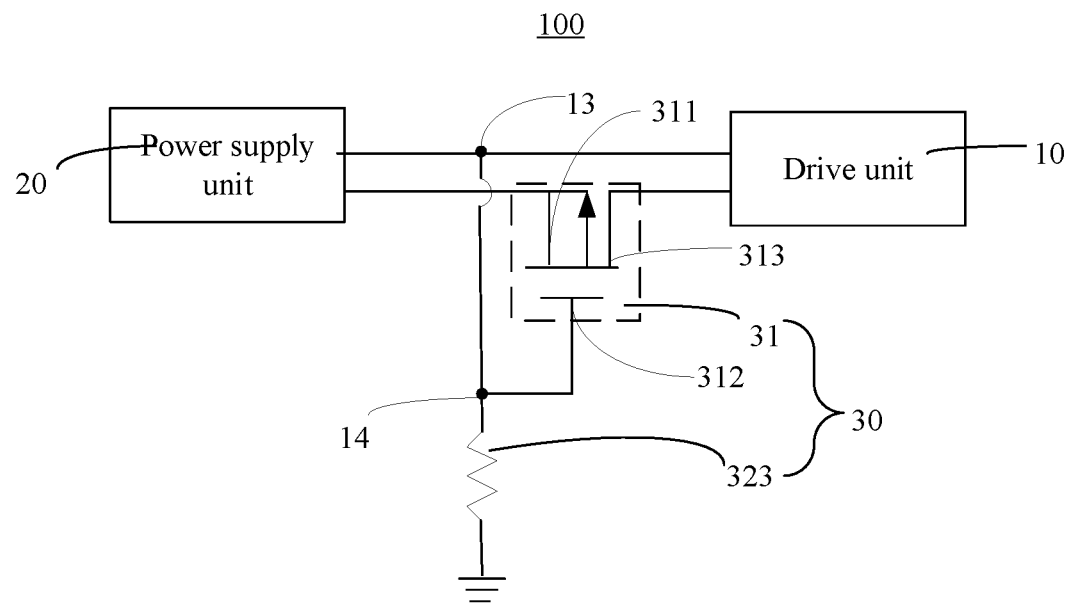
FIG. 3 is a schematic view of a circuit of a power supply device in accordance with still another embodiment of the present disclosure.

Referring to FIG. 4, it is a block view of a display device according to an embodiment of the present disclosure. Further referring to FIG. 1, FIG. 2, and FIG. 3, as shown, the display device 200 includes a display module 210 and a power supply device 100. The power supply device 100 includes a drive unit 10, a power supply unit 20, an electronic switch unit 31, and a voltage dividing unit 32. The drive unit 10 is electrically connected to the display module 210. The power supply unit 20 is electrically connected to the drive unit 10, and a first node 11 is disposed between the power supply unit 20 and the drive unit 10. The electronic switch unit 31 has an input terminal 311, a control terminal 312, and an output terminal 313. The input terminal 311 is electrically connected to the power supply unit 20, and the output terminal 313 is electrically connected to the drive unit 10. The voltage dividing unit 32 is electrically connected to the control terminal 312. An end of the voltage dividing unit 32 is electrically connected to the first node 11, and the other end of the voltage dividing unit 332 is electrically connected to the ground terminal B.

Specifically, the display device 200 of the present disclosure includes a display module 210 and a power supply device 100. The display module 210 can be a display panel of any type, such as a liquid crystal display panel based on thin film transistor liquid crystal display (TFT-LCD) technology, a liquid crystal display panel based on liquid crystal display (LCD) technology, an organic electro-laser display panel based on organic electroluminescence display (OLED) technology, a quantum dot light emitting diode display panel based on quantum dot light emitting diodes (QLED) technology, or a curved display panel, etc. The power supply device 100 can be the power supply device 100 in aforedescribed first and second embodiments. Therefore, when the power supply device 100 performs an action, a signal can be output to the display module 210 via the drive unit 10.

It is worth to noted that, in the case of no conflict, the power supply device 100 included in the display device 200 can also be the power supply device 100 in the aforedescribed embodiment, therefore the forgoing implementations cannot be constructed as limitations.

In summary, in the embodiments of the present disclosure, when the power supply device 100 is powered on, the electronic switch unit 31 is in the OFF state, while when the power supply unit 20 can properly output the stable voltage HVAA, an optional predetermined judging manner is utilized to turn the electronic switch unit 31 into the ON state from the OFF state, so that the power supply unit 20 properly supplies the stable voltage HVAA to the drive unit 10, thereby the drive unit 10 can operate properly. When the power supply device 100 is powered on, due to that the current which may flow back to the power supply unit 20 from the drive unit 10 is prevented from reaching the power supply unit 20, an abnormal situation of the power supply unit 20 caused by the recharged current is avoided.

The above embodiments are adopted to only describe rather than limit the technical solutions of the disclosure. Although detailed descriptions about the disclosure have been made with reference to preferred embodiments, it should be understood that those skilled in the art may make modifications or equivalent replacements to the technical solutions of the disclosure without departing from the purpose and scope of the technical solutions, which shall fall within the scope of the claims of the disclosure.

What is claimed is:

1. A power supply device (100), comprising:
    a drive unit (10) configured to drive a display device;
    a power supply unit (20) electrically connected to the drive unit (10), configured to provide power; and
    a protection unit (30) electrically connected between the drive unit (10) and the power supply unit (20), configured to prevent current from recharging, wherein the protection unit (30) comprises an electronic switch unit (31), electrically connected to the power supply unit (20) and the drive unit (10), respectively; and a voltage dividing unit (32), a first end of the voltage dividing unit (32) is electrically connected to the electronic switch unit (31), a second end of the voltage dividing unit (32) is electrically connected between the power supply unit (20) and the drive unit (10), and the other end of the voltage dividing unit (32) is grounded.

2. The power supply device (100) according to claim 1, wherein the electronic switch unit (31) comprises:
    an input terminal (311) electrically connected the power supply unit (20);
    a control terminal (312) electrically connected to the voltage dividing unit (32); and
    an output terminal (313) electrically connected the drive unit (10).

3. The power supply device (100) according to claim 2, wherein the voltage dividing unit (32) comprises a first suppressing member (321) electrically connected to the first node (11) located between the power supply unit (20) and the drive unit (10); and a second suppressing member (322), an end of the second suppressing member (322) is electrically connected to the first suppressing member (321), and the other end of the second suppressing member (322) is grounded.

4. The power supply device (100) according to claim 3, wherein, a second node (12) disposed between the second suppressing member (322) and the first suppressing member (321); and the control terminal (312) is electrically connected to the second node (12).

5. The power supply device (100) according to claim 2, wherein the voltage dividing unit (32) comprises a third suppressing member (323), an end of the third suppressing member (323) is electrically connected to a third node (13) located between the power supply unit (20) and the drive unit (10) (13); and the other end of the third suppressing member (323) is grounded.

6. The power supply device (100) according to claim 5, wherein a fourth node (14) is disposed between the third node (13) and the third suppressing member (323), the control terminal (312) is electrically connected the fourth node (14).

7. The power supply device (100) according to claim 5, wherein the third suppressing member (323) is a resistor.

8. The power supply device (100) according to claim 5, wherein the third suppressing member (323) is an inductor.

9. The power supply device according to claim 1, wherein the electronic switch unit (31) is a transistor.

10. A display device (200), comprising:
    a display module (210);
    a power supply device (100), comprising:
    a drive unit (10) electrically connected to the display module (210);
    a power supply unit (20) electrically connected to the drive unit (10); and
    an electronic switch unit (31) having an input terminal (311), a control terminal (312) and an output terminal (313), the input terminal (311) being electrically connected to the power supply unit (20), and the output terminal (313) being electrically connected to the drive unit (10); and
    a voltage dividing unit (32) electrically connected to the control terminal (312), an end of the voltage dividing unit (32) being electrically connected between the power supply unit (20) and the drive unit (10), and the other end of the voltage dividing unit (32) being grounded.

11. The display device (200) according to claim 10, wherein the display module (210) is a liquid crystal display panel.

12. The display device (200) according to claim 10, wherein the display module (210) is a quantum dot light emitting diode display panel.

13. The display device (200) according to claim 10, wherein the voltage dividing unit (32) comprises a first suppressing member (321) electrically connected to the first node (11) located between the power supply unit (20) and the drive unit (10); and a second suppressing member (322), an end of the second suppressing member (322) is electrically connected to the first suppressing member (321), and the other end of the second suppressing member (322) is grounded;
- a second node (12) disposed between the second suppressing member and the first suppressing member, and the control terminal being electrically connected to the second node (12); and
- wherein the first suppressing member (321) and the second suppressing member (322) are resistors.

14. The display device (200) according to claim 10, wherein the voltage dividing unit (32) comprises a third suppressing member (323), an end of the third suppressing member (323) is electrically connected to a third node located between the power supply unit (20) and the drive unit (10), the other end of the third suppressing member (323) is grounded; wherein the control terminal (312) is electrically connected to a fourth node (14) located between the third node (13) and the third suppressing member (323).

15. The display device (200) according to claim 10, wherein the electronic switch unit (31) is a transistor.

16. A power supply device (100), comprising:
- a drive unit (10) configured to drive a display module;
- a power supply unit (20) electrically connected to the drive unit (10) via a first wire and a second wire, wherein an operating voltage of the second wire is a half of an operating voltage of the first wire;
- a protection unit (30) electrically connected between the drive unit (10) and the power supply unit (20), and comprising:
- an electronic switch unit (31) having an input terminal (311), a control terminal (312), and an output terminal (313), wherein the input terminal (311) is electrically connected the power supply unit (20) via the second wire, the output terminal (312) is electrically connected to the drive unit (10) via the second wire;
- a first resistor (321), an end of the first resistor (321) being electrically connected to the first node (11) on the first wire; and
- a second resistor (322), an end of the second resistor (322) being electrically connected to the other end of the first resistor (321), a second node (12) being disposed between the first resistor (321) and the second resistor (322) to be electrically connected to the control terminal (312), and the other end of the second resistor (322) being grounded.

17. The power supply device (100) according to claim 16, further comprising:
- an inductor (323), an end of the inductor (323) being electrically connected to a third node (13) located between the power supply unit (20) and the drive unit (10), the other end of the third suppressing member inductor (323) being grounded; wherein the control terminal (312) is electrically connected to a fourth node (14) located between the third node (13) and the inductor (323).

18. The power supply device (100) according to claim 16, wherein the electronic switch unit (31) is a transistor.

* * * * *